United States Patent [19]

Vlasblom

[11] Patent Number: 5,604,193

[45] Date of Patent: Feb. 18, 1997

[54] ADHESIVE AND ENAMEL REMOVER, AND METHOD OF USE WITH D-LIMONENE, DIBASIC ESTER, AN N-METHYL PYRROLIDONE

[75] Inventor: Jack T. Vlasblom, Dunedin, Fla.

[73] Assignee: Dotolo Research Corporation, Largo, Fla.

[21] Appl. No.: 351,620

[22] Filed: Dec. 8, 1994

[51] Int. Cl.⁶ .................. C11D 7/24; C11D 7/26; C11D 7/32; B08B 3/08

[52] U.S. Cl. .................. 510/212; 510/407; 510/211; 510/213; 510/201; 510/210; 510/200; 510/434; 134/40; 134/38

[58] Field of Search .................. 252/542, 153, 252/162, 170, 171, DIG. 8; 134/40, 38; 510/407, 211, 213, 201, 210, 200, 434, 212

[56] References Cited

U.S. PATENT DOCUMENTS

| | | | |
|---|---|---|---|
| 4,780,235 | 10/1988 | Jackson | 252/170 |
| 4,934,391 | 6/1990 | Futch et al. | 134/40 |
| 5,064,557 | 11/1991 | Fusiak | 252/162 |
| 5,167,853 | 12/1992 | Stevens | 252/162 |
| 5,298,184 | 3/1994 | Jarema | 252/171 |
| 5,334,331 | 8/1994 | Fusiak | 134/40 X |
| 5,360,580 | 11/1994 | Dotolo et al. | 252/542 |
| 5,415,788 | 5/1995 | Vlasblom et al. | 252/8.57 |

FOREIGN PATENT DOCUMENTS 389829  10/1990  European Pat. Off. .

*Primary Examiner*—Douglas J. McGinty
*Attorney, Agent, or Firm*—Donald R. Fraser

[57] ABSTRACT

A composition useful for removing adhesives and enamels from surfaces consists of d-limonene, dibasic acid ester, and N-methyl pyrrolidone.

12 Claims, No Drawings

ADHESIVE AND ENAMEL REMOVER, AND METHOD OF USE WITH D-LIMONENE, DIBASIC ESTER, AN N-METHYL PYRROLIDONE

FIELD OF THE INVENTION

This invention relates generally to a composition of matter which is useful for removing adhesives and enamels from the surfaces of processing equipment, workpieces, etc. More particularly, the invention is directed to such a formulation containing, inter alia, d-limonene, which formulation has low mammalian toxicity and is biodegradable.

BACKGROUND OF THE INVENTION

Many materials are currently available for removing adhesives and enamels from the surfaces of processing equipment and other articles containing the unwanted residues of such compounds. However, the prior art materials, e.g., toluene, xylene, chlorinated solvents, and the like, tend to be toxic and non biodegradable. A more user and environmentally friendly composition for removing adhesive residues and enamel residues is needed.

SUMMARY OF THE INVENTION

Accordant with the present invention, a non-toxic, biodegradable composition for removing adhesives and enamels has surprisingly been discovered. It consists of d-limonene, dibasic acid ester, and N-methyl pyrrolidone.

The composition for removing natural adhesives and enamels according to the present invention is particularly useful for cleaning, for example, natural urethane adhesive residue from application machinery and enamel coating residue from application sprayguns.

Further objects and advantages of this invention will be apparent from the following description and appended claims.

DESCRIPTION OF THE PREFERRED EMBODIMENT

The composition for removing natural adhesives and enamels according to the present invention consists of a combination of d-limonene, dibasic acid ester, and N-methyl pyrrolidone.

D-limonene is a terpene which occurs naturally in all plants. It is a monocyclic unsaturated terpene which is generally a by-product of the citrus industry, derived from the distilled rind oils of oranges, grapefruits, lemons, and the like. A discussion concerning d-limonene and its derivation from numerous sources is set forth in Kesterson, J. W., "Florida Citrus Oil," Institute of Food and Agriculture Science, University of Florida, December, 1971. D-limonene is commercially available from Florida Chemical Company and from SMC Glidco Organics. D-limonene may be present in the inventive formulation at a concentration from about 10 to about 70 weight percent. Preferably, the concentration of d-limonene is about 38 weight percent.

Dibasic acid ester may be present in the inventive formulation at a concentration from about 10 to about 75 weight percent. The term dibasic acid ester includes dialkyl esters of dicarboxylic aliphatic acids, and mixtures thereof. Suitable dibasic acid esters according to the present invention include, but are not necessarily limited to, dimethyl adipate, dimethyl succinate, dimethyl glutarate, and the like, as well as mixtures thereof. A preferred dibasic acid ester may be obtained from DuPont Chemicals of Wilmington, Del. under the tradename "DBE-1", which comprises mixture of dimethyl glutarate, dimethyl adipate, and dimethyl succinate. Preferably, the concentration of dibasic acid ester is about 30 weight percent.

N-methyl pyrrolidone is a well-known compound which may be present in the inventive formulation at a concentration from about 10 to about 80 weight percent. Preferably, the concentration of N-methyl pyrrolidone is about 32 weight percent.

The listed components of the inventive formulation may be mixed then blended together in conventional mixing apparatus. The resultant formulation may then be utilized to remove the unwanted residues of natural adhesives and/or enamels from the surfaces of processing equipment or contaminated articles. The inventive formulation is sprayed or otherwise conventionally applied to the surface, the natural adhesive or enamel dissolved by the formulation, and the residue is wiped off of the surface using a clean cloth.

EXAMPLE

The following ingredients are mixed together in the approximate weight percentages indicated, to prepare a composition useful for removing natural adhesives and enamels. Thereafter, the formulation is applied to the surface of an article contaminated with urethane adhesive residue. The inventive formulation dissolves the residue which is then removed by wiping with a clean cloth.

TABLE I

COMPOSITION FOR REMOVING ADHESIVE AND ENAMEL

| Ingredient | Weight Percent |
| --- | --- |
| d-limonene(1) | 38 |
| dibasic acid ester(2) | 30 |
| N-methyl pyrrolidone | 32 |

(1)GLIDSAFE, from SMC Glidco Organics
(2)DBE-1, from DuPont Chemicals

This example may be repeated with similar success by substituting the generically or specifically described ingredients and/or concentrations recited herein for those used in the preceding Example.

From the foregoing description, one ordinarily skilled in the art can easily ascertain the essential characteristics of the invention and, without departing from its spirit and scope, can make various changes and modifications to adapt the invention to various uses and conditions.

What is claimed is:

1. A composition for removing adhesives and enamels, consisting of:

about 10 to about 70 weight percent d-limonene;

about 10 to about 75 weight percent dibasic acid ester selected from the group consisting of dimethyl adipate, dimethyl succinate, dimethyl glutarate, and mixtures thereof; and about 10 to about 80 weight percent N-methyl pyrrolidone.

2. A method for removing adhesives and enamels from a surface, comprising applying to said surface a composition consisting of:

about 10 to about 70 weight percent d-limonene;

about 10 to about 75 weight percent dibasic acid ester selected from the group consisting of dimethyl adipate, dimethyl succinate, dimethyl glutarate, and mixtures thereof; and about 10 to about 80 weight percent N-methyl pyrrolidone.

3. The method according to claim 2, wherein the concentration of d-limonene is about 38 weight percent.

4. The method according to claim 2, wherein the concentration of dibasic acid ester is about 30 weight percent.

5. The method according to claim 2, wherein the concentration of N-methyl pyrrolidone is about 32 weight percent.

6. The composition according to claim 1, wherein the concentration of d-limonene is about 38 weight percent.

7. The composition according to claim 1, wherein the concentration of dibasic acid ester is about 30 weight percent.

8. The composition according to claim 1, wherein the concentration of N-methyl pyrrolidone is about 32 weight percent.

9. A composition for removing adhesives and enamels, consisting of:

about 38 weight percent d-limonene;

about 30 weight percent dibasic acid ester selected from the group consisting of dimethyl adipate, dimethyl succinate, dimethyl glutarate, and mixtures thereof; and about 32 weight percent N-methyl pyrrolidone.

10. The composition according to claim 9, wherein the dibasic acid ester is a mixture of dimethyl adipate dimethyl succinate, and dimethyl glutarate.

11. A method for removing adhesives and enamels from a surface, comprising applying to said surface a composition consisting of:

about 38 weight percent d-limonene;

about 30 weight percent dibasic acid ester selected from the group consisting of dimethyl adipate, dimethyl succinate, dimethyl glutarate, and mixtures thereof; and about 32 weight percent N-methyl pyrrolidone.

12. The method according to claim 11, wherein the dibasic acid ester is a mixture of dimethyl adipate, dimethyl succinate, and dimethyl glutarate.

* * * * *